W. A. TURBAYNE.
STARTING AND GENERATING SYSTEM.
APPLICATION FILED MAY 20, 1916.

1,366,544.

Patented Jan. 25, 1921.
2 SHEETS—SHEET 2.

Witnesses
David H. Tinkler
Ralph Munden

Inventor
William A. Turbayne
By Raymond H. Van Vorst
Attorney

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STARTING AND GENERATING SYSTEM.

1,366,544.  Specification of Letters Patent.  Patented Jan. 25, 1921.

Application filed May 20, 1916. Serial No. 98,830.

*To all whom it may concern:*

Be it known that I, WILLIAM A. TURBAYNE, a citizen of the United States, residing at Niagara Falls, in the county of Niagara and State of New York, have invented new and useful Improvements in Starting and Generating Systems, of which the following is a specification.

The present invention relates to improvements in dynamo-electric machines.

More particularly the invention relates to systems involving dynamo-electric machines which in service are subjected to wide variations in speed and in which it is desired to keep the output substantially constant. This result has generally been accomplished heretofore in practice by employing a regulator in the field circuit to vary the field resistance as the output tends to increase. This regulator is mechanically or electro-magnetically operated.

In some systems the generator output has been maintained at the proper value without the use of an external regulator. The present invention relates to such inherently regulated dynamo-electric machines.

Some of the inherently regulated dynamo-electric machines, though they operate satisfactorily at relatively low speeds, have such small voltages impressed across their field windings at high speeds, that small variations in brush and commutator conditions will have relatively great effects on the field voltage, resulting in erratic performances on the part of said dynamo-electric machines.

In application Serial No. 86,971, filed March 27, 1916, by the present applicant, there is described a dynamo-electric machine for overcoming the difficulties just referred to. Said dynamo-electric machine employs two pairs of brushes, one pair supplying the field excitation of the machine and the other supplying the outside circuit. One brush of each pair is offset from a point of maximum potential difference on the commutator, whereby the shifting of the field flux, due to armature reaction, will result in the regulation of the output of the dynamo-electric machine. The present invention constitutes a modification of the invention described in said application and accomplishes the regulation by the use of only three brushes.

An object of the present invention is to provide improved means whereby the dynamo-electric machine will be regulated to deliver a substantially constant current, notwithstanding wide variations in speed.

A further object is to provide a generator in which the voltage impressed across the field windings may be varied independently of the voltage impressed across the terminals of the machine.

A further object is to provide a generator of the inherently regulated type having good stability of action at all speeds.

Other objects will appear as the description proceeds.

A further object is to provide a starting and generating system involving the improved dynamo-electric machine above referred to.

Referring to the drawings.

Figure 1:
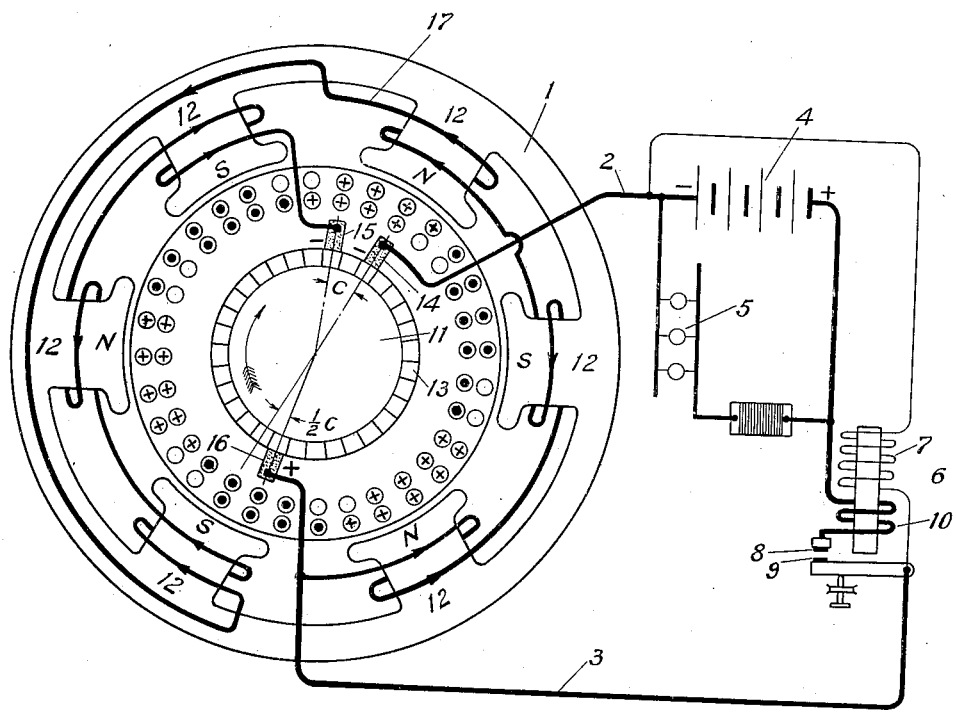
Figure 1 represents diagrammatically a system employing an improved dynamo-electric machine according to the present invention.

In Fig. 1 the dynamo-electric machine is indicated as a whole by the numeral 1. Said dynamo-electric machine supplies mains 2 and 3, across which a storage battery 4 and lamps 5 may be connected in parallel branches. An automatic switch 6 is connected in one of the main leads. This switch has a shunt lifting coil 7 adapted, when sufficiently energized, to close the main circuit between the generator and battery at the contacts 8 and 9. The switch also has a series holding coil 10 in series in one of the generator leads and in series with the contacts 8 and 9. The switch 6 may be of any preferred construction and is adapted to close the main circuit when the generator voltage equals a predetermined amount. When the generator is at rest or operating at low speeds, the battery tends to discharge through the generator and hence the current is reversed in the holding coil 10, which then opposes the lifting coil 7 and causes the switch to open.

The dynamo-electric machine has a rotating armature and a stationary field. The armature may be either of the Gramme or drum types. In the embodiment of the invention herein chosen to illustrate the principles of the invention, the armature 11 is of the drum type and the field has six symmetrically arranged poles 12. The armature is provided with a six-pole series wave winding having symmetrical end connections so that the points of maximum difference of potential on the commutator 13 will be in line with the centers of poles of opposite polarity, spaced substantially 180 electrical degrees apart.

Referring to Fig. 1, it will be noted that three brushes bear on the commutator 13. One of these brushes 14 is placed directly in the center line of one of the poles 12, while the brush 15 is placed back of the brush 14 in a position determined by the angle C. The brush 16 is located nearly opposite the brush 14, but is placed back of such a diametrical position by an angle equal to C/2. The field winding comprising the conductor 17 encircling the poles 12, is connected between brushes 15 and 16, while the external circuit is supplied through brushes 14 and 16. The effects of this arrangement are best illustrated by reference to Fig. 2 which gives a development of the armature windings and which indicates by means of arrow-heads the direction of current in the armature conductors. The distribution of voltage around the commutator under light load and under loaded conditions, is illustrated by the full line and dotted line curves respectively, the ordinates indicating representative voltage values. Under light load conditions the brushes 14 and 16, supplying the outside circuit, bear on the commutator at points having a potential difference of approximately 12 volts. The brushes 15 and 16, which excite the field circuit, are shown as bearing on the commutator at points having a potential difference of approximately 8 volts. An exciting current will therefore flow in the field windings, its direction in the various armature conductors being represented by the lower row of arrows in Fig. 2. After the automatic switch closes and current is supplied to the outside circuit, current will flow in the armature conductors in a direction illustrated by the upper row of arrows. In certain of the armature conductors the sum of the field and load current will flow, while in others only the difference between these currents will flow. This condition is best represented in Fig. 1, in which the conductors carrying the sum of the two currents are indicated by crosses and dots, while those carrying the difference are left blank. The crosses and dots are used conventionally, indicating respectively that the current is flowing away from and toward the observer.

Figure 2:
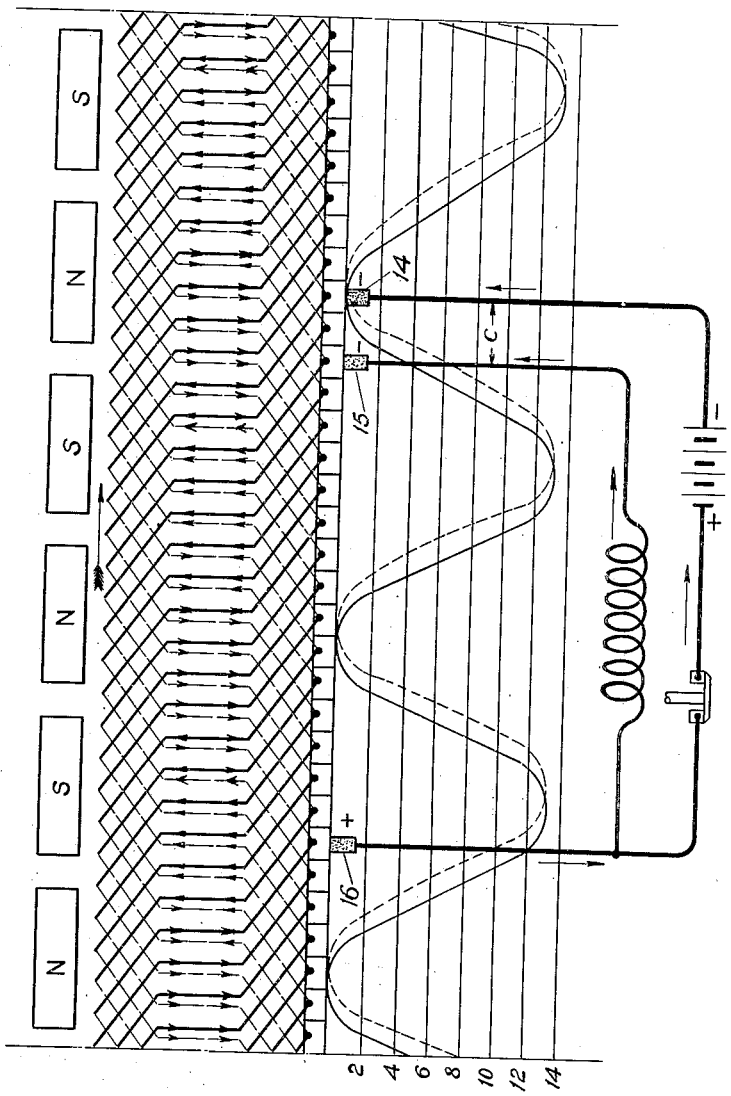
Fig. 2 is a diagrammatic development of the armature windings and illustrates diagrammatically the manner in which the generator output is determined.

An increase of speed, tending to bring about an increase in both the field and load currents, will, by reason of the reaction of these currents upon the field flux, act to shift the resultant flux axis and consequently the distribution of voltage around the commutator, as indicated by the broken line curve in Fig. 2. This distortion of voltage will act to raise the potential on exciting brush 15 and reduce the voltage on brush 16 slightly, and therefore result in a reduction in field current. This distortion of field flux will have substantially no effect in changing the potential on main brush 14. The only effect on the main brushes 14 and 16 will be the slight lowering of the potential on brush 16 referred to above. Consequently, the distribution of the field flux will result in altering the field excitation of the dynamo-electric machine, practically independently of the potential across the main brushes. The altering of the field excitation will result in a substantially constant output from the generator at varying speeds. Furthermore, the voltage across the field circuit will be maintained at a sufficiently high value that it will not be sensitive to slight variations in brush and commutator conditions.

In the wave form indicating voltage variations around the commutator in Fig. 2, it is noted that there are rounded crests and troughs. The rounded portion of the crest adjacent the commutator may be considered as either a wave or a trough. Consequently, in the accompanying claims the terms crest and trough are used in a relative and not in an absolute sense, being merely convenient terms to indicate maximum points of difference in the wave forms.

One embodiment of the present invention has been described in detail. Many modifications will suggest themselves to those skilled in the art. It is intended in this case to include all such modifications which fall within the scope of the invention as defined by the appended claims.

What I claim as new and desire to secure by Letters Patent of the United States, is:—

1. In a system wherein a dynamo-electric machine operates to simultaneously charge a storage battery and furnish current to translating devices and in which, at such times that said dynamo-electric machine is inoperative, the storage battery operates to supply current to said translating devices, a dynamo-electric machine having field poles and an armature, a commutator for said armature, main brushes embracing an angle of said commutator equal to 180 electrical degrees minus 1/2 C, an auxiliary brush spaced in the direction of armature rotation, an angle equal to 180 electrical degrees minus 1/2 C from one of said main brushes, said auxiliary brush being spaced an angle C from the other of said main brushes, a field circuit connected between said auxiliary brush and said one brush and a storage battery connected across said main brushes.

2. A dynamo-electric machine having field poles, an armature, a commutator, a first main brush located at a point whose potential decreases materially under the influence of armature cross flux, a second main brush subtending an angle of less than 180 degrees with said first brush and located at a point whose potential does not materially change under the influence of armature cross flux, and an auxiliary brush subtending less than 180 degrees with said first brush in the opposite direction from said second brush and located at a point whose potential materially increases under the influence of armature cross flux and a field circuit connected between said auxiliary brush and said first brush to supply current for the excitation of said field poles.

3. In combination, a dynamo-electric machine having a rotatable armature provided with a commutator with diametrically placed relatively fixed points of maximum potential difference when said machine is running on open circuit, main brushes embracing less than one half of said commutator, a main circuit connected across said main brushes, one of said brushes being located substantially at one of said points, an auxiliary brush embracing with the other of said main brushes part of but less than the other half of said commutator, and a field winding connected to said last mentioned main brush and said auxiliary brush, said auxiliary brush and said one main brush being symmetrically arranged with said other main brush.

4. In combination, a dynamo-electric machine having a rotatable armature provided with a commutator with diametrically placed relatively fixed points of maximum potential difference when said machine is running on open circuit, main brushes embracing less than one half of said commutator, a main circuit connected across said main brushes, one of said brushes being located substantially at one of said points, and an auxiliary brush embracing with one of said main brushes part of but less than the other half of the commutator, and a field winding connected to said last mentioned brush and said auxiliary brush, said auxiliary brush being located adjacent the main brush which is located substantially at one of said points, said auxiliary brush and its adjacent main brush being symmetrically arranged relative to said other main brush.

5. A dynamo-electric machine having a field and an armature provided with a commutator with diametrically placed points of maximum potential difference when said machine is running on open circuit, a first main brush located substantially at one of said points, a second main brush located less than 180 degrees from said first main brush, said main brushes being adapted to supply an outside circuit, and an auxiliary brush located adjacent said first main brush and less than 180 degrees from said second main brush, a winding connected across said auxiliary brush and said second main brush to supply the field excitation of said dynamo-electric machine, the arc between said first main brush and said second main brush being distinct from the arc between said auxiliary brush and said second main brush, said auxiliary brush and its adjacent main brush being symmetrically arranged relative to said other main brush.

6. A dynamo-electric machine having field poles and an armature whereby, when the said machine is running on open circuit, waves of voltage values are produced with rounded crests and troughs approximately fixed relative to said field poles but which waves are shiftable by means of the armature cross flux when said machine is loaded, brushes for collecting current from said armature between a point whose potential does not materially change under the influence of armature cross flux and a point whose potential decreases under the influence of armature cross flux, and a third brush, a field winding connected between said third brush and one of said brushes located at the second mentioned point, said third brush being located at a point whose potential is raised when the cross flux acts.

7. A dynamo electric machine having field poles, an armature and brushes whereby upon operation of said machine on open circuit an electro-magnetic force is set up having a wave form including rounded crests and troughs approximately fixed relative to said brushes, said wave form being shiftable by the action of the armature cross flux, one of said brushes being located at a point whose potential is lowered by the action of the armature cross flux, another of said brushes being located at a point whose potential is raised by the action of the armature cross flux and the third of which brushes is located at a point whose potential is not substantially affected by the armature cross flux, said machine having a field winding connected between the first two of said brushes.

8. A dynamo-electric machine having field poles and an armature, main brushes adapted to collect current for an external circuit, an auxiliary brush, a field circuit connecting said auxiliary brush to one of said main brushes to supply current for energizing said field poles, said auxiliary brush being located at a point whose potential difference with one of said main brushes decreases as the effect of armature cross flux increases, the other of said main brushes being located at a point whose potential difference with said one main brush decreases as the effect of armature cross flux increases.

9. A dynamo-electric machine having field poles and an armature, a first main brush located at a point of maximum potential when said machine is operating on open circuit, a second main brush located adjacent to but removed from a point of maximum potential of the opposite sense, an auxiliary brush located at a point whose potential changes materially under the influence of armature cross flux, and a field winding connected between said second main brush and said auxiliary brush, said first mentioned main brush and said auxiliary brush being symmetrically arranged relative to said second main brush.

In witness whereof, I have hereunto subscribed my name.

WILLIAM A. TURBAYNE.